July 2, 1929. H. G. SMITH 1,719,566
AUXILIARY HEADLIGHT BRACKET FOR MOTOR VEHICLES
Filed Dec. 3, 1927
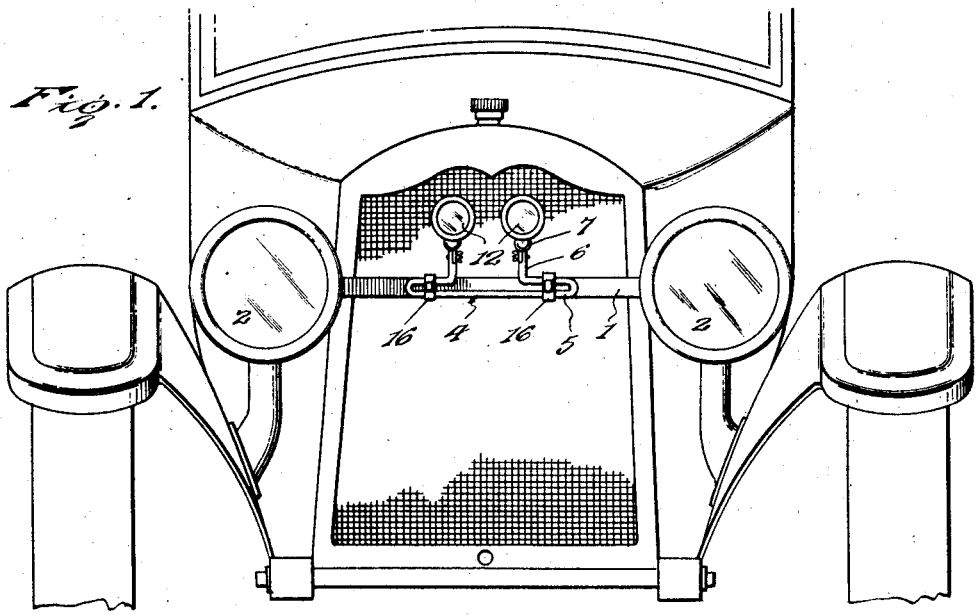
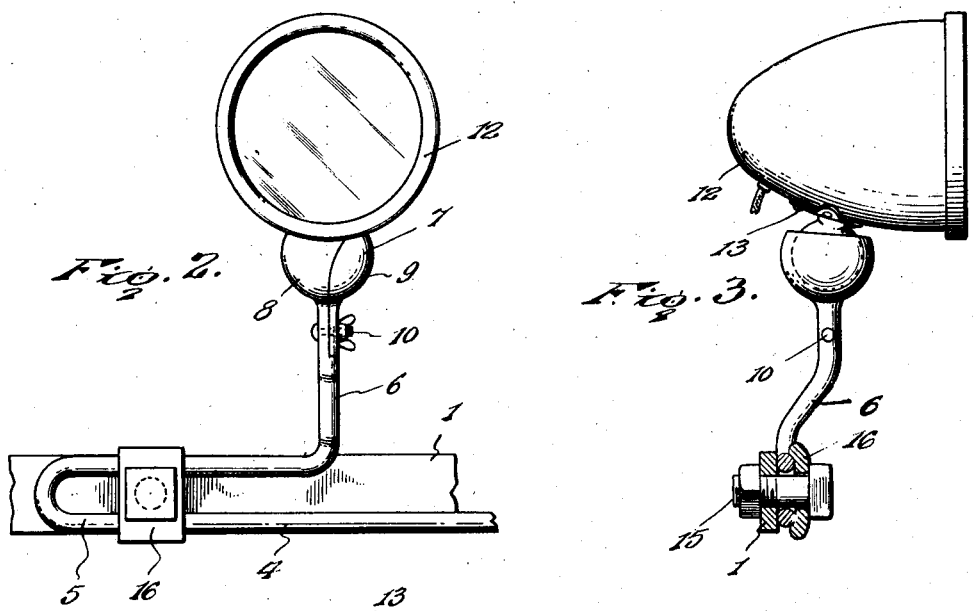
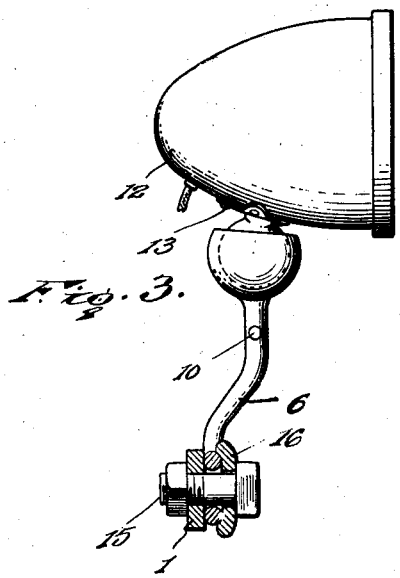
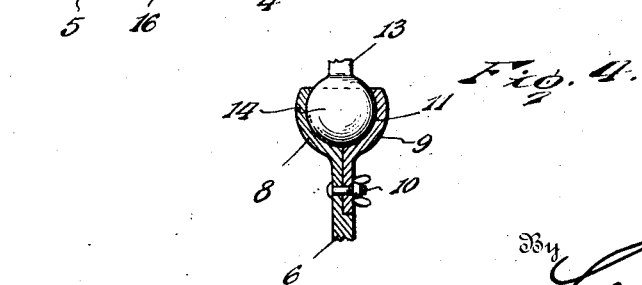
Inventor
H. G. Smith.
By Lacey & Lacey, Attorneys Patented July 2, 1929.

1,719,566

UNITED STATES PATENT OFFICE.

HARVEY G. SMITH, OF SALINA, KANSAS.

AUXILIARY HEADLIGHT BRACKET FOR MOTOR VEHICLES.

Application filed December 3, 1927. Serial No. 237,459.

The present invention is directed to improvements in auxiliary headlight brackets for motor vehicles.

The primary object of the invention is to provide a device of this character so constructed that it can be conveniently attached to a motor vehicle in order that the auxiliary headlights will be mounted between the usual headlights, the construction of the bracket being such that the auxiliary headlights can be easily adjusted when desired.

Another object of the invention is to provide a device of this kind which is extremely simple in construction, easy to apply, and one which can be manufactured at a very small cost.

With these and other objects in view, this invention resides in the novel features of construction, formation, combination and arrangement of parts to be hereinafter more fully described, claimed and illustrated in the accompanying drawing, in which,—

Figure 1 is a front elevation of the bracket showing the same in place upon a motor vehicle.

Figure 2 is a fragmentary front view of the bracket on an enlarged scale.

Figure 3 is a side elevation, the brace bar being shown in section.

Figure 4 is a detail sectional view through one of the socket members.

Referring to the drawing, 1 designates a conventional form of brace bar which extends between the usual headlight 2 of a motor vehicle, and it is upon this bar that the auxiliary headlights 3 are supported by the improved bracket.

The bracket 4 employed is formed from a single length of stout stock and is bent to provide terminal loops 5, the upper arms of said loops terminating in vertical arms 6, said arms being laterally spaced.

Carried upon the upper ends of the arms 6 are socket members 7 which consist of sections 8 and 9, the former being integral parts of the arms 6, while the latter are secured for cooperation with the former by clamping bolts 10. Obviously, when the sections 8 and 9 are in assembled relationship semi-circular sockets 11 are provided, the purpose of which will be later explained. The auxiliary headlights 12 are provided with pedestals 13, having upon their lower ends rounded heads 14 adapted to engage in the sockets 11.

Clamping bolts 15 are employed for securing the brackets to the brace bar 1, said bolts being passed between the bars of the loops 5 and through the bar 1, there being washers 16 engaged upon the bolts, said washers being engaged with the bars of the loops as clearly shown in Figure 3 of the drawings. The brackets can be easily applied or removed, and when in place upon the bar 1 will be firmly secured thereto by said bolts.

It will be obvious that the auxiliary headlights can be adjusted in order that the rays therefrom can be directed in any desired spot upon the roadway.

If desired the bracket may be secured to the brace bar 1 in inverted position in order that the headlights will be positioned below said bar.

Having thus described the invention, I claim:

The combination with the brace bar of a motor vehicle, of a bracket consisting of a single length of material bent upon itself to provide oppositely opposed terminal loops, said loops having their upper members provided with vertically disposed arms, laterally spaced, bolts passable through the loops and bar for maintaining the bracket clamp to said bar, and auxiliary headlights connected with said vertical arms and universally adjustable thereto.

In testimony whereof I affix my signature.

HARVEY G. SMITH. [L. S.]